US009307560B2

(12) United States Patent
Zhao et al.

(10) Patent No.: US 9,307,560 B2
(45) Date of Patent: Apr. 5, 2016

(54) METHOD FOR SCHEDULING A RANDOM-ACCESS COMMUNICATION SYSTEM WITH ABSOLUTE AND PROPORTIONAL THROUGHPUT GUARANTEES

(71) Applicant: Macau University of Science and Technology, Macau (MO)

(72) Inventors: Qinglin Zhao, Macau (MO); Zhijie Ma, Macau (MO)

(73) Assignee: Macau University of Science and Technology, Macau, MO (US)

( * ) Notice: Subject to any disclaimer, the term of this patent is extended or adjusted under 35 U.S.C. 154(b) by 49 days.

(21) Appl. No.: 14/308,713

(22) Filed: Jun. 19, 2014

(65) Prior Publication Data

US 2015/0373742 A1    Dec. 24, 2015

(51) Int. Cl.
*H04W 74/08* (2009.01)
*H04W 84/12* (2009.01)

(52) U.S. Cl.
CPC ...... *H04W 74/0833* (2013.01); *H04W 74/0816* (2013.01); *H04W 84/12* (2013.01)

(58) Field of Classification Search
CPC .................................................. H04W 74/0833
See application file for complete search history.

(56) References Cited

U.S. PATENT DOCUMENTS

| 2003/0103521 A1* | 6/2003 | Raphaeli ................. H04B 3/542 370/445 |
| 2005/0122989 A1* | 6/2005 | Ginzburg ........... H04W 74/0816 370/445 |
| 2007/0091807 A1* | 4/2007 | Yoshikawa .......... H04L 43/0876 370/232 |
| 2007/0211751 A1* | 9/2007 | Yoshikawa ........ H04W 74/0825 370/447 |
| 2009/0303908 A1* | 12/2009 | Deb ....................... H04W 28/18 370/310 |

OTHER PUBLICATIONS

Bejarano, O., Knightly, E.W., and Park, M., "IEEE 802.11ac: From channelization to multi-user MIMO," IEEE Communications Magazine, vol. 51, pp. 84-90, 2013.

Perahia, E., Cordeiro, C., Park, M., and Yang, L.L., "IEEE 802.11ad: Defining the next generation multi-gbps Wi-Fi," in Consumer Communications and Networking Conference (CCNC), pp. 1-5, 2010.

(Continued)

*Primary Examiner* — Brian D Nguyen
*Assistant Examiner* — Toan Nguyen
(74) *Attorney, Agent, or Firm* — Ella Cheong Hong Kong; Sam T. Yip (57) ABSTRACT

A method for scheduling a random-access communication system having high-priority (HP) and low-priority (LP) nodes is provided, where the scheduling is configured such that the system provides an absolute throughput guarantee for the HP nodes, and a proportional throughput guarantee for the LP nodes. The method is based on obtaining a length of a contention window assigned to an individual node, which is either a HP or a LP node, from a per-slot attempt rate of this individual node. In particular, the attempt rate of each individual node is determined by an algorithm configured such that a resultant sum of the per-slot attempt rates of all the individual nodes is a fixed value independent of the number of the individual nodes. By this scheduling method, the maximum system throughput is approached. The method can be advantageously used in a wireless local area network (WLAN).

18 Claims, 4 Drawing Sheets

(56) References Cited

OTHER PUBLICATIONS

Yoon, D., Lee, S., Hong, J., and Chung, K., "Weighted bandwidth sharing scheme to guarantee the video quality in home networks," in International Conference on Information Networking (ICOIN), IEEE, pp. 423-427, Jan. 28-30, 2013.

Banchs, A., Perez, X., and Qiao, D., "Providing Throughput Guarantees in IEEE 802.11e Wireless LANs," Proceedings of the 18th International Teletraffic Congress (ITC-18), pp. 1001-1010, 2003.

Nassiri, M., Heusse, M., and Duda, A., "A Novel Access Method for Supporting Absolute and Proportional in 802.11 WLANs," Proceedings of 2008 IEEE Conference on Computer Communications (INFOCOM), pp. 709-717, 2008.

Bianchi, G., "Performance analysis of the IEEE 802.11 distributed coordination function," IEEE Journal on Selected Areas in Communications, vol. 18, No. 3, pp. 535-547, Mar. 2000.

Zhao, Q.L., Tsang, D.H.K., and Sakurai, T., "A novel CAC scheme for homogeneous 802.11 networks," IEEE Transactions on Wireless Communications, vol. 9, No. 3, pp. 1168-1174, 2010.

\* cited by examiner

METHOD FOR SCHEDULING A RANDOM-ACCESS COMMUNICATION SYSTEM WITH ABSOLUTE AND PROPORTIONAL THROUGHPUT GUARANTEES

CLAIM FOR FOREIGN PRIORITY

This application claims priority under 35 U.S.C. §119 to the Australia Innovation Patent Application No. 2014100684 filed Jun. 19, 2014, and the disclosure of which is incorporated herein by reference in its entirety.

FIELD OF THE INVENTION

The present invention relates to scheduling a random-access communication system for providing absolute throughput guarantee to one or more high-priority nodes and proportional throughput guarantee to one or more low-priority nodes.

BACKGROUND

There follows a list of references that are occasionally cited in the specification. Each of the disclosures of these references is incorporated by reference herein in its entirety.

LIST OF REFERENCES

[1] O. Bejarano, E. W. Knightly, and M. Park, "IEEE 802.11ac: From channelization to multi-user MIMO," *IEEE Communications Magazine*, vol. 51, pp. 84-90, 2013.

[2] E. Perahia, C. Cordeiro, M. Park, and L. L. Yang, "IEEE 802.1 lad: Defining the next generation multi-gbps Wi-Fi," in *Consumer Communications and Networking Conference (CCNC)*, pp. 1-5, 2010.

[3] D. Yoon, S. Lee, J. Hong, and K. Chung, "Weighted bandwidth sharing scheme to guarantee the video quality in home networks," in *International Conference on Information Networking (ICOIN)*, IEEE, pp. 423-427, 28-30 Jan. 2013.

[4] A. Banchs, X. Perez, and D. Qiao, "Providing Throughput Guarantees in IEEE 802.11e Wireless LANs," *Proceedings of the 18th International Teletraffic Congress (ITC-18)*, pp. 1001-1010, 2003.

[5] M. Nassiri, M. Heusse, and A. Duda, "A Novel Access Method for Supporting Absolute and Proportional in 802.11 WLANs," *Proceedings of 2008 IEEE Conference on Computer Communications (INFOCOM)*, pp. 709-717, 2008.

[6] G. Bianchi, "Performance analysis of the IEEE 802.11 distributed coordination function," *IEEE Journal on Selected Areas in Communications*, vol. 18, no. 3, pp. 535-547, March 2000.

[7] Q. L. Zhao, D. H. K. Tsang, and T. Sakurai, "A novel CAC scheme for homogeneous 802.11 networks," *IEEE Transactions on Wireless Communications*, vol. 9, no. 3, pp. 1168-1174, 2010.

[8] S. Wiethoelter, M. Emmelmann, C. Hoene, and A. Wolisz, "TKN EDCA Model for NS2," Technische Universitat Berlin, Tech. Rep. TKN-06-003, June 2006.

[9] "The Network Simulator: Building Ns" (http://www.isi.edu/nsnam/ns/ns-build.html).

[10] "Intermediate value theorem" (http://en.wikipedia.org/wiki/Intermediate_valuetheorem).

From WiFi to the latest IEEE 802.11ac [1] and 802.11ad [2], wireless local area networks (WLANs) have already been widely deployed in thousands of families. In a typical scenario of wireless home networks, some people watch online high-definition digital TV (HDTV), while the others desire to browse online hot news. Watching online HDTV consumes a huge bandwidth, which might cause a significant delay in accessing the Internet. This situation calls for a reasonable bandwidth allocation to provide absolute throughput needed for inelastic traffic (such as online TV) and relative throughput for elastic traffic (such as text message), at the same time to maximize the system utilization. Consider a random-access communication system with one high-priority (HP) class and one low-priority (LP) class. It is desired to schedule the system by setting different contention windows (CWs) for nodes of different classes so as to achieve the following three objectives simultaneously:

providing an absolute (or a fixed) throughput guarantee for the HP nodes;

providing a proportional throughput guarantee for LP nodes, where all LP nodes share the available bandwidth according to the desired ratios; and maximizing the system throughput.

In the art, only subsets of these three objectives are achieved by prior-art scheduling techniques. For example, [3] only considered providing weighted bandwidth allocation to video streams; [4] just provided absolute throughput guarantee, not considering proportional throughput guarantee; and [5] focused on supporting absolute and proportional priorities, rather than absolute and proportional throughput guarantees. There is a need in the art to have a technique for scheduling a random-access communication system such that the three aforementioned objectives are achieved.

SUMMARY OF THE INVENTION

An aspect of the present invention is to provide a scheduling method for achieving the aforementioned three objectives. In particular, the method is for scheduling a random-access communication system having one or more HP nodes, one or more LP nodes and a hub. The one or more HP nodes and the one or more LP nodes contend for sending data packets to the hub. Each individual HP node has a pre-determined throughput value for the system to provide by the scheduling. The scheduling is configured such that the system provides an absolute throughput guarantee for the one or more HP nodes, and a proportional throughput guarantee for the one or more LP nodes. The method comprises obtaining a length of a contention window assigned to an individual node, which is either a HP or a LP node, from a per-slot attempt rate of this individual node. In addition, the method further comprises determining the attempt rate of each individual node by an algorithm configured such that a resultant sum of the per-slot attempt rates of all the individual nodes is a fixed value independent of the number of the individual nodes.

The random-access communication system may be a WLAN so that the hub is an access point of the WLAN. The WLAN may be an IEEE 802.11-compliant WLAN.

Other aspects of the present invention are disclosed as illustrated by the embodiments hereinafter.

DETAILED DESCRIPTION

In the present invention, a random-access communication system with one HP class and one LP class is considered. By setting different contention windows (CWs), it is desired to achieve the aforementioned three objectives simultaneously, namely: providing an absolute throughput guarantee for HP nodes; providing a proportional throughput guarantee for LP nodes; and maximizing a system throughput. An aspect of the present invention is a scheduling method for achieving these objectives by determining CW lengths for the HP nodes and the LP nodes.

The present invention is exemplarily illustrated by considering a WLAN as an example to the random-access communication system. The exact and approximate solutions to the optimal CWs are presented. These solutions are obtained based on the IEEE 802.11 DCF protocol, which is the most practical, robust, and popular WLAN protocol. The existence and uniqueness of the approximate solution are proved. Simulation experiments done by the Inventors have verified that the approximate solution can well achieve the three objectives. For example, the mean relative errors from simulation are 1.14%, 0.91%, and 1.18% for the targeted fixed-throughput, proportional throughput ratio, and system throughput, respectively.

The Inventors have observed that in existing techniques such as [3]-[5], supporting absolute priority is such that absolute-priority nodes are benefited from all available throughput even if some non-absolute-priority nodes already exist, consequently lowering the bandwidth utilization because the absolute-priority nodes may acquire more bandwidth than is required. In the present invention, on the other hand, supporting absolute throughput guarantee is realized by that the HP nodes are guaranteed to acquire the bandwidth for providing the required throughput only, rather than to occupy more bandwidth than is necessary.

For simplicity in presentation, herein in the specification and the appended claims, the terms "node i" and "i th node" are used interchangeably with the same meaning.

A. Model Assumptions and Problem Formulation

We consider a one-hop WLAN with two classes: HP class and LP class. The HP class has n nodes and the LP class has m nodes so that the total number of nodes is N=n+m. Each node i, $1 \le i \le N$, always generates a random back-off count uniformly distributed in [0, $CW_i-1$] for each new transmission or retransmission, where $CW_i > 1$. All nodes send data to an access point (AP), where the AP only acts as a receiver. It is assumed that: 1) all nodes hear each other and run in the basic mode; 2) there are ideal channel conditions (that is, the transmission errors are a result of packet collision only); and 3) all nodes are in saturated operation (that is, each node always has packets to transmit) and have the same packet size L.

The problem is formulated as follows. Let $\beta \triangleq (\beta_1, \beta_2, \ldots, \beta_N)$, where $\beta_i$, $1 \le i \le N$, represents the attempt rate of node i per slot (namely, the mean number that node i attempts to transmit a packet in a slot). In the saturated operation, $\beta_i$ is calculated from $CW_i$ by [6]

$$\beta_i = \frac{2}{CW_i + 1} \quad (1)$$

It follows that finding the optimal ($CW_1, CW_2, \ldots, CW_N$) is equivalent to finding the optimal $\beta$.

Let $\Gamma_i \triangleq \Gamma_i(\beta)$, $1 \le i \le N$, be the throughput of node i under $\beta$. Let $a_i$, $1 \le i \le N$, represent the fixed throughput required by each HP node i. Let $r_i$, $1 \le i \le m$, represent the proportional throughput ratio between the LP nodes n+i and n+1. In the considered WLAN, it is desired to find the optimal $\beta$ so as to guarantee each HP node's fixed throughput requirement $a_i$ and each LP node's proportional throughput requirement $r_i$, and at the same time maximize the system throughput $\Sigma_{i=1}^{N} \Gamma_i$. That is, $$\text{the optimal } \beta = \underset{\beta}{\operatorname{argmax}} \sum_{i=1}^{N} \Gamma_i(\beta) \quad (2)$$

$$\text{over } \Gamma_i(\beta) = a_i, \quad (3)$$
$$1 \le i \le n,$$

$$\frac{\Gamma_{n+i}(\beta)}{\Gamma_{n+1}(\beta)} = r_i, \quad (4)$$
$$1 \le i \le m.$$

In the next section, we express the throughput $\Gamma_i$ and find the optimal $\beta$.

B. The Optimal Attempt Rate

This section first expresses the per-node throughput F, and then calculates the exact and approximate solutions to the optimal $\beta$.

B.1 Per-Node Throughput

Let $P_s^i$ be the probability of a successful transmission of node i, $1 \le i \le N$. Since node i can successfully transmit a packet only if all other nodes do not transmit, we have $$P_s^i = \beta_i \prod_{j \ne i}^{N} (1 - \beta_j), \quad (5)$$

$$1 \le i \le N.$$

Let $P_e$ and $P_c$ be the idle probability and collision probability of a slot, respectively. We have $$P_e = \prod_{i=1}^{N} (1 - \beta_i) \qquad (6)$$

and $$P_c = 1 - \sum_{i=1}^{N} P_s^i - P_e. \qquad (7)$$

Let $\Omega$ be the mean time that elapses for one decrement of the back-off counter. Note that the back-off counter decreases by one for each idle slot and is suspended when the channel is busy. Then $\Omega$ can be calculated by $$\Omega = \sigma P_e + T_s \sum_{i=1}^{N} P_s^i + T_c P_c. \qquad (8)$$

In (8): $\sigma$ is the duration of one time slot; and $T_s$ ($T_c$)$\gg\sigma$ is the mean time of a successful (an unsuccessful) transmission, where $T_s$ is given in Table 1. We further assume that $T_s=T_c$ to simplify analysis. This assumption has widely been used in previous work such as [7], and can be removed easily. Under this assumption, (8) reduces to $\Omega=(\sigma-T_c)P_e+T_c$.

The throughput of node i, $\Gamma_i$, $1 \leq i \leq N$, is defined as the number of bits that node i successfully transmits in a time duration of $\Omega$. Then we have $$\Gamma_i = \frac{LP_s^i}{(\sigma - T_c)P_e + T_c} \qquad (9)$$

where L denotes the packet size.

B.2 Exact Solution to the Optimal $\beta$

The exact solution to the optimal $\beta$ can be found in five steps below.

Step 1: Express $\beta_{n+i}$, $1 \leq i \leq m$, in terms of $\beta_{n+1}$. From (4), (5) and (9), we have $$r_i = \frac{\Gamma_{n+i}}{\Gamma_{n+1}} = \frac{\beta_{n+i}(1-\beta_{n+1})}{\beta_{n+1}(1-\beta_{n+i})}. \qquad (10)$$

Then $\beta_{n+i}$ can be expressed in terms of $\beta_{n+1}$, namely $$\beta_{n+i} = \frac{r_i \beta_{n+1}}{1 - \beta_{n+1} + r_i \beta_{n+1}}, \qquad (11)$$

$1 \leq i \leq m$.

Step 2: Express $\beta_i$, $1 \leq i \leq n$, in terms of $\beta_{n+1}$. Note that $\Gamma_i/\Gamma_1 = a_i/a_1$ and regard $a_i/a_1$ as the throughput ratio between nodes i and 1. From (11), we have $$\beta_i = \frac{\frac{a_i}{a_1}\beta_1}{1 - \beta_1 + \frac{a_i}{a_1}\beta_1}, \quad 1 \leq i \leq n. \qquad (12)$$

Step 3: Setup a relationship between $\beta_{n+1}$ and $\beta_1$. After substituting (5) and (6) into (9), we rewrite $\Gamma_1=a_1$ as $$a_1 = \frac{L\beta_1 \times \prod_{i=2}^{n}(1-\beta_i) \times \prod_{i=1}^{m}(1-\beta_{n+i})}{(\sigma - T_c) \times \prod_{i=1}^{n}(1-\beta_i) \times \prod_{i=1}^{m}(1-\beta_{n+i}) + T_c}. \qquad (13)$$

Further, substituting (11) and (12) into (13), we obtain an implicit relationship between $\beta_{n+1}$ and $\beta_1$.

Step 4: Express $\Sigma_{i=1}^{N}\Gamma_i$ in terms of $\beta_{n+1}$ and $\beta_1$. With (3) and (4), the system throughput $\Sigma_{i=1}^{N}\Gamma_i$ is written as $$\sum_{i=1}^{N} \Gamma_i = \sum_{i=1}^{n} a_i + \Gamma_{n+1} \sum_{i=1}^{m} r_i \qquad (14)$$

$$= \sum_{i=1}^{n} a_i + \frac{\beta_{n+1}(1-\beta_1)}{\beta_1(1-\beta_{n+1})} a_1 \sum_{i=1}^{m} r_i \qquad (15)$$

where from (14) to (15), we use the expression of $\Gamma_{n+1}/\Gamma_1$, which can be obtained according to (5) and (9).

Step 5: Find the optimal $\beta$. We first search all pairs of $\beta_{n+1}$ and $\beta_1$ that satisfy (13), then choose their optimal values maximizing (15), and finally calculate other $\beta_i$'s by (11) and (12).

In general, it is not easy to find the exact solution to the optimal $\beta$ because there are infinite pairs of $\beta_{n+1}$ and $\beta_1$. In addition, we even do not know whether the exact solution exits and is unique. We therefore seek the approximate solution in the next subsection.

C. Approximate Solution to the Optimal $\beta$

In order to find the approximate solution to the optimal $\beta$, we adopt a key approximation, $\beta_i \ll 1$, which is widely used in the related literature such as [5]. The approximation holds true since $\beta_i$, represents the per-node attempt rate in a very short slot and therefore it is generally much small.

In the following, we first consider a simple case of n=1 and m$\geq$1, and then utilize the derived result to find the approximate solution for the general case of n$\geq$1 and m$\geq$1.

C.1 The Case of n=1 and m$\geq$1

With the approximation $\beta_i \ll 1$, we can calculate the per-node attempt rate $\beta_i$, by following the steps as in Section B.2. The derived result is summarized in Theorem 1 below. Theorem 1 states that the approximate solution must exist and be unique, and provides a method to compute it quickly and easily.

Theorem 1: When n=1 and m$\geq$1, with the approximation that $\beta_i \ll 1$, we have the following results.

(a) The optimal solution 13, to (2)(4) is uniquely given by $$\beta_i = \begin{cases} \frac{B + T_c e^{\varphi}}{A}, & i = 1 \\ \frac{r_{i-1}\varphi}{\sum_{j=1}^{m} r_j}, & i = 2, 3, \dots, N, \end{cases} \qquad (16)$$

where: $A=L/a_1+\sigma-T_c$; $B=\sigma-T_c$; and $\phi=\beta_2 \Sigma_{j=1}^{m} r_j$ is the total attempt rate of LP nodes and it is the only solution to $h(\phi)=0$ in which $h(\phi) \triangleq B+T_c e^{\phi}(1-\phi)$ and $0<\phi<1$.

(b) Given the packet size L and the fixed HP throughput $a_1$, the total attempt rate of all nodes and the maximum system throughput are constants, independent of the total node number and the proportional LP throughput ratios.

Proof Please refer to Section C.3.

From $\beta_1 \leq 1$ and the expression of f3, given by (16), we can obtain the upper bound of $a_1$, namely, $a_1 \leq L/(T_c e^\Phi)$.

C.2 The Case of $n \geq 1$ and $m \geq 1$

Theorem 1(b) states that for the given L and $a_1$, the total attempt rate of all nodes is independent of the total node number. This reveals the idea of computing the approximate solution when $n \geq 1$, as explained below.

First, compute HP node1's attempt rate $\beta_1$ and the total attempt rate $\Sigma_{i=1}^N \beta_i$ by regarding all HP nodes except node 1 as the LP nodes, according to (16) in Theorem 1(a) and the parameter values of L and $a_1$.

Next, compute HP node i's attempt rate, $\beta_i$, $1 \leq i \leq n$, according to (19) shown in Section C.3 and the throughput ratio $a_i/a_1$ between node i and node 1.

$$\beta_i = \frac{a_i}{a_1} \beta_1, \quad 1 \leq i \leq n. \quad (17)$$

Finally, compute LP node n+i's attempt rate, $\beta_{n+i}$, $1 \leq i \leq m$, by allocating all remaining attempt rates to the LP nodes according to their ratios, $r_i$'s:

$$\beta_{n+i} = \frac{r_i}{\sum_{j=1}^m r_j} \left( \sum_{j=1}^N \beta_j - \sum_{j=1}^n \beta_j \right), \quad 1 \leq i \leq m. \quad (18)$$

C.3 Appendix: Proof of Theorem (1)

Theorem 1(a) is proved by two steps below.

Step 1: Express $\beta_i$ by (16). When n=1, (10) reduces to $r_i \approx \beta_{i+1}/\beta_2$. Since $\beta_i \ll 1$, it follows that $$\beta_{i+1} = r_i \beta_2 = \frac{r_i \varphi}{\sum_{j=1}^m r_j}, \quad 1 \leq i \leq m. \quad (19)$$

Substituting (19) into (13), we get an explicit relationship between $\beta_1$, and $\beta_2$:

$$\beta_1 = \frac{B + \frac{T_c}{\prod_{j=1}^m (1 - r_j \beta_2)}}{A} \approx \frac{B + T_c e^\varphi}{A} \quad (20)$$

where we apply the approximations: $\beta_i \ll 1$; and $(1-x)^y \approx e^{-xy}$ for $x \ll y$. Combining (19) and (20), we obtain (16).

Step 2: Prove that $\varphi$ exists and is unique. First, we can express $\Sigma_{i=1}^N T_i$ in terms of $\varphi$. According to (19), (15) reduces to $$\sum_{i=1}^N \Gamma_i = a_1 + a_1 A \frac{\varphi}{B + T_c e^\varphi}. \quad (21)$$

Second, setting the first-order derivative of $\Sigma_{i=1}^N T_i$ with respect to $\varphi$ to 0, we obtain $h(\varphi)=0$. Third, the solution to $h(\varphi)=0$ must exist uniquely from the intermediate value theorem [10], because (i) $h(\varphi)$ is continuous and decreasing over the range $(0,+\infty)$ as a result of $h'(\varphi)=-\varphi T_c e^\varphi<0$; $h(0)=\sigma>0$; and (iii) $h(1)=\beta<0$.

We next explain Theorem 1(b). From (16), the total attempt rate of all nodes is given by $$\sum_{i=1}^N \beta_i = \frac{B + T_c e^\varphi}{A} + \varphi \quad (22)$$

For the given packet size L and the HP throughput $a_1$, A, B and $T_c$ are constants while $\varphi$ is the unique solution to $h(\varphi)=0$. Consequently, the total attempt rate $\rho_{i=1}^N \beta_i$ in (22) and the maximum system throughput $\rho_{i=1}^N T_i$ in (21) are constants, irrespective of what the total node number and the proportional LP throughput ratios are.

D. Model Verification

In this section, we demonstrate the efficiency of the disclosed scheduling scheme for WLANs. We use the 802.11e EDCA simulator [8] in ns2 version 2.28 [9] as a validation tool. In the simulation, we differentiate CW parameters only, so we set AIFS=DIFS, TXOP=0, and $CW_{min}=C_{max}=CW_i$ for node i. The other protocol parameter values are listed in Table 1 and are set according to the IEEE 802.11b specification. Each simulation run lasts for 200 seconds.

TABLE 1

| Parameters for IEEE 802.11b. | | | |
|---|---|---|---|
| m/M | 5/7 | Header | 228 μs = M header + Pheader |
| σ | 20 μs | $T_s$ | = Header + $L_{tm}$ + SIFS + ACK + DIFS |
| SIFS | 10 μs | $L_{pn}$ | = L bytes @ $R_{data}$ |
| DIFS | 50 μs | ACK | 304 μs = 24 bytes @ $R_{basic}$ + 14 bytes @ $R_{basic}$ |
| $R_{data}$ | 11 Mbps | M header | 20 μs = 24 bytes @ $R_{data}$ + 4 bytes @ $R_{data}$ |
| $R_{basic}$ | 1 Mbps | Pheader | 208 μs = 26 bytes @ $R_{basic}$ |

In our experiment, the HP class has n=2 nodes with the fixed throughput requirements: $a_1$=0.24 Mbps and $a_2$=0.48 Mbps. The LP class has m nodes with the proportional throughput ratios: $r_1$=1 for $1 \leq i \leq m/2$, and $r_i$=2 for $m/2+1 \leq i \leq m$, where m=2, 4, ..., 18. Each node has the same packet size, L=1500 bytes. We set $CW_i$=[$2/\beta_i$-1] by (1) in simulation, where [·] denotes a rounding function. The exact solution to $\beta_i$ is calculated by (11) and (12) in Section B.2. The approximate solution to is calculated by (17) and (18) in Section B.3. Table 2 shows the obtained values of $CW_i$'s.

TABLE 2

| | Exact and approximate solutions to CW and system throughput | | | | | | | | | |
|---|---|---|---|---|---|---|---|---|---|---|
| | Exact solution [Eqns. (11) and (12)] | | | | | Approximate solution [Eqns. (17) and (18)] | | | | |
| m (n = 2) | $CW_1$ | $CW_2$ | $CW_{m1}$ | $CW_{m2}$ | System throughput (Mbps) | $CW_1$ | $CW_2$ | $CW_{m1}$ | $CW_{m2}$ | System throughput (Mbps) |
| 2 | 265 | 133 | 35 | 18 | 6.3889 | 337 | 168 | 43 | 21 | 6.1912 |
| 4 | 313 | 157 | 82 | 42 | 6.2648 | 337 | 168 | 88 | 43 | 6.1912 |
| 6 | 327 | 164 | 129 | 65 | 6.2279 | 337 | 168 | 132 | 66 | 6.1912 |

TABLE 2-continued

Exact and approximate solutions to CW and system throughput

| | Exact solution [Eqns. (11) and (12)] | | | | | Approximate solution [Eqns. (17) and (18)] | | | | |
|---|---|---|---|---|---|---|---|---|---|---|
| m (n = 2) | $CW_1$ | $CW_2$ | $CW_{m1}$ | $CW_{m2}$ | System throughput (Mbps) | $CW_1$ | $CW_2$ | $CW_{m1}$ | $CW_{m2}$ | System throughput (Mbps) |
| 8 | 333 | 167 | 175 | 88 | 6.2102 | 337 | 168 | 177 | 88 | 6.1912 |
| 10 | 338 | 170 | 222 | 112 | 6.1997 | 337 | 168 | 221 | 110 | 6.1912 |
| 12 | 341 | 171 | 269 | 135 | 6.1928 | 337 | 168 | 266 | 132 | 6.1912 |
| 14 | 344 | 173 | 317 | 159 | 6.1879 | 337 | 168 | 310 | 155 | 6.1912 |
| 16 | 344 | 173 | 363 | 182 | 6.1843 | 337 | 168 | 355 | 177 | 6.1912 |
| 18 | 345 | 173 | 409 | 205 | 6.1815 | 337 | 168 | 399 | 199 | 6.1912 |

Note.m1 ∈ {3, . . . , 2 + m/2} and m2 ∈ {3 + m/2, . . . , 2 + m}.

Figure 1:
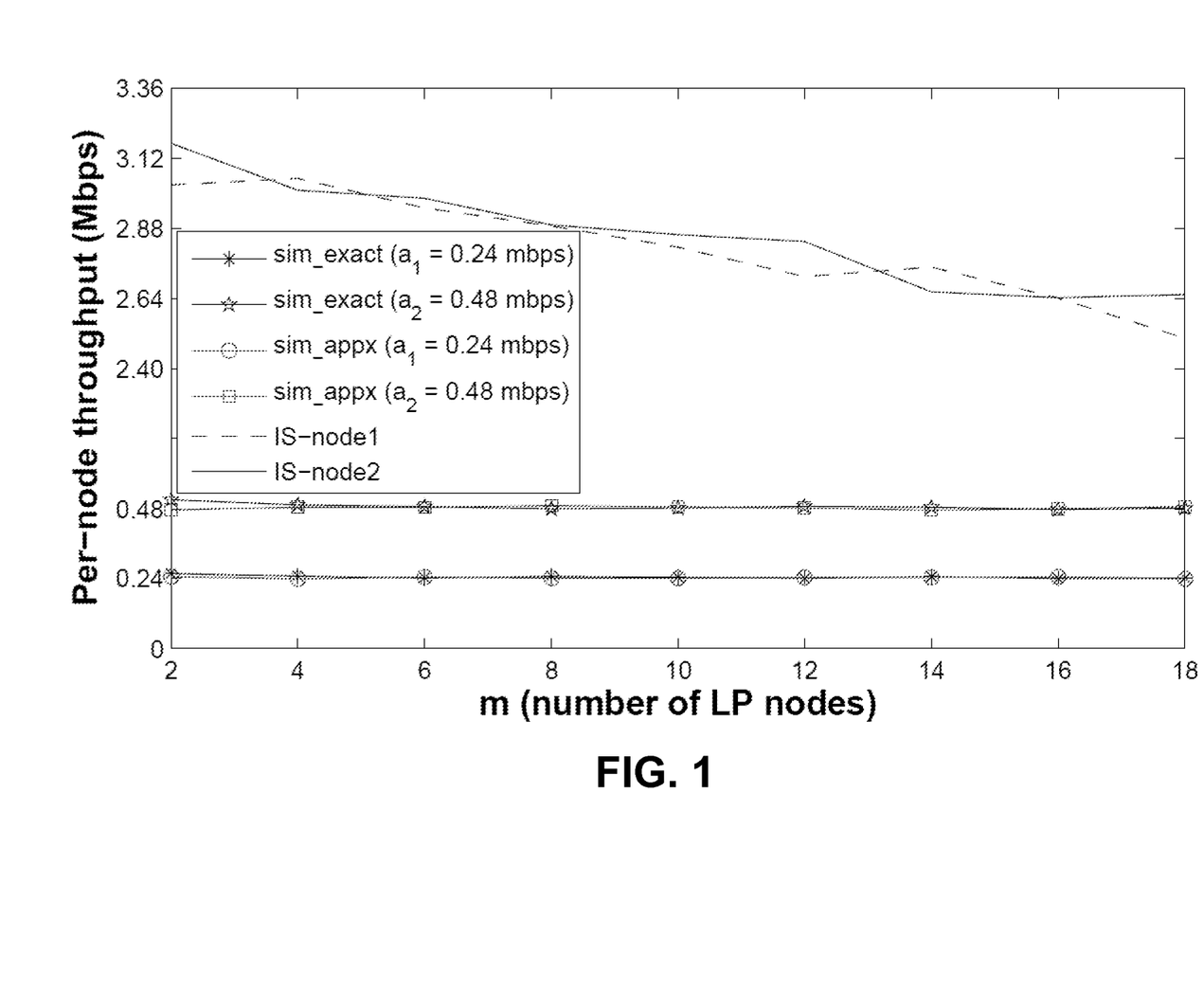
FIG. 1 is a plot obtained from a simulation experiment for illustrating that the absolute throughput guarantee is achievable by the present invention, the plot showing a per-node throughput for a HP class versus the number of LP nodes where the HP class has n=2 nodes with the following fixed throughput requirements: $a_1$=0.24 Mbps and $a_2$=0.48 Mbps.
Figure 2:
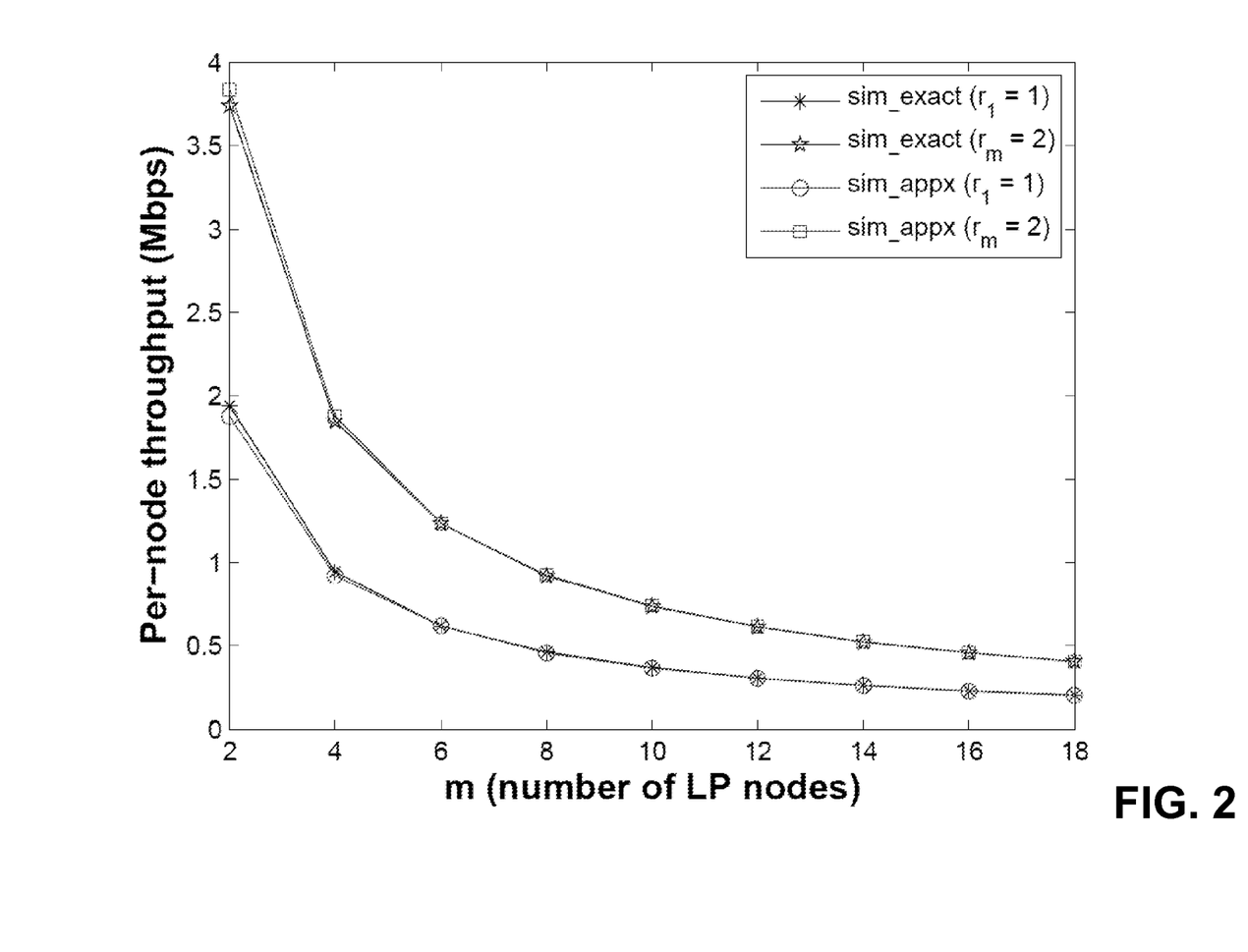
FIG. 2 is a plot obtained from the simulation experiment for illustrating that the proportional throughput guarantee is achievable by the present invention, the plot showing a per-node throughput for a LP class versus the number of LP nodes where the LP class has m nodes, and the required throughput ratio between the first half of and the second half of m nodes is 1:2.
Figure 3:
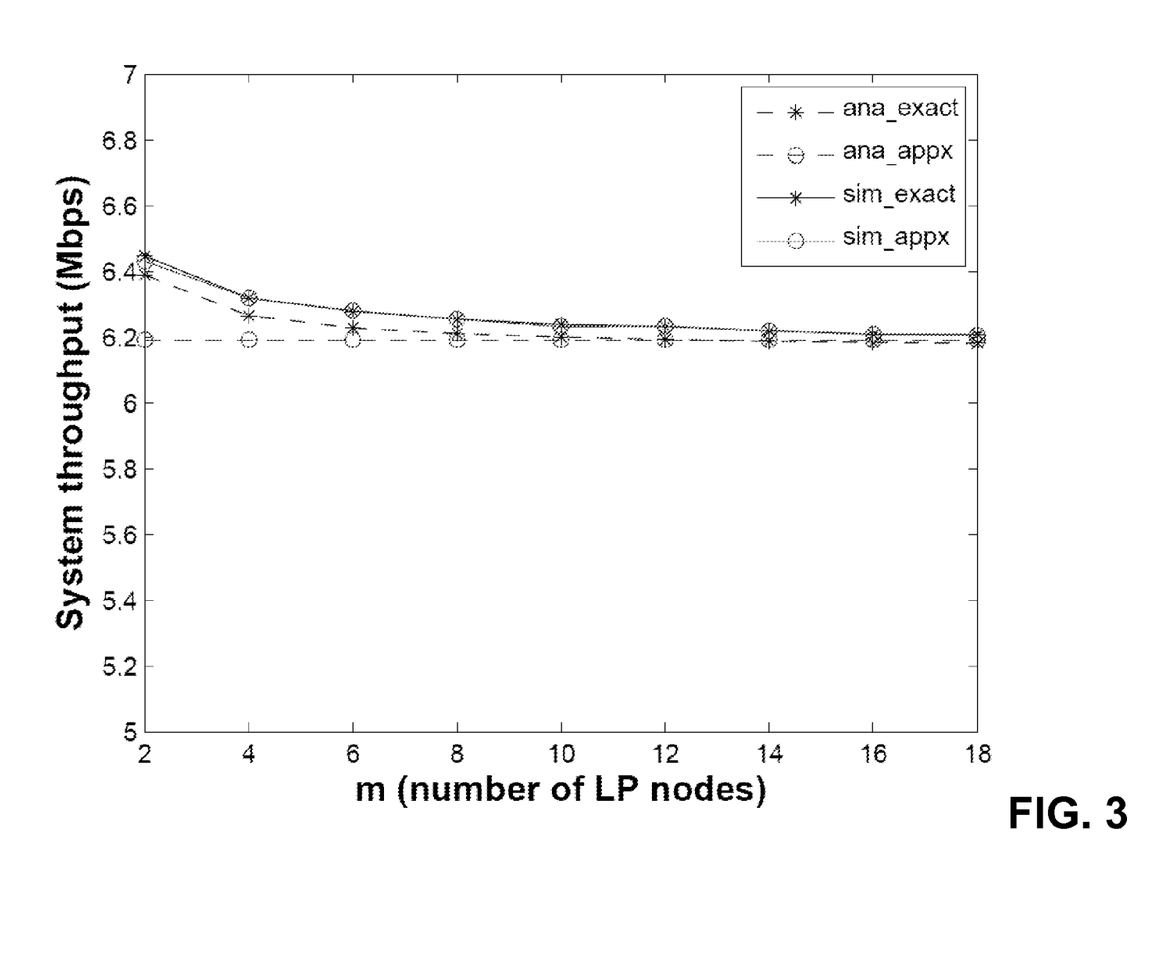
FIG. 3 is a plot obtained from the simulation experiment for illustrating that the system throughput is maximized by the present invention, the plot showing the system throughput versus the number of the LP nodes, where n=2 and m=2, 3, ..., 18.

We now explain that the derived $CW_i$'s can guarantee the fixed throughput requirement of the HP nodes (as shown in FIG. 1), guarantee the proportional throughput ratios of the LP nodes (as shown in FIG. 2), and maximize the system throughput (as shown in FIG. 3). In FIGS. 1 to 3, the labels "ana_exact" and "ana_appx" denote the theoretical exact throughput (15) and the approximate throughput (21), respectively; the labels "sim_exact" and "sim_appx" denote the simulation results based on the exact and the approximate solutions, respectively. Define the relative error to be the ratio of |simulation_value-target_value| to target_value. We use the mean relative error and the maximum relative error to evaluate the accuracy of the proposed model.

FIG. 1 plots the per-node throughput of HP class versus the number of LP nodes (note that the y-axis is not equally divided). There are 2 nodes in the HP class. The fixed throughput requirements of node 1 and node 2 are $a_1$=0.24 Mbps and $a_2$=0.48 Mbps, respectively. From FIG. 1, we can observe that the sim_appx simulation curves closely match the corresponding sim_exact simulation curves, respectively; and we can calculate that for the target value of either $a_1$=0.24 Mbps or $a_2$=0.48 Mbps, the mean relative error and the maximum relative error are 1.14% and 2.33%, respectively. This manifests that the proposed scheme can guarantee the fixed throughput requirements of the HP class. In addition, FIG. 1 compares the throughput of the absolute-priority nodes in [5] with the throughput of the HP nodes obtained by the present invention. The labels "IS-node 1" and "IS-node2" denote the throughputs of the two absolute-priority nodes. From FIG. 1, we can see that 1) two absolute-priority nodes obtain almost the same throughput; and 2) the obtained throughput is more than is required (i.e. $a_1$=0.24 Mbps or $a_2$=0.48 Mbps). The reason is that 1) in [5], the absolute-priority nodes are always benefited from all available throughput even if some non-absolute-priority nodes exist; and 2) [5] did not differentiate the service for the absolute-priority nodes.

FIG. 2 plots the per-node throughput of the LP class versus the number of the LP nodes. Since the absolute-priority nodes in [5] has shared almost all available throughput, then we just discuss the throughput of the LP nodes in this work. There are m nodes in the LP class, where m varies from 2 to 18. The required throughput ratio between the first half of and the second half of m nodes is 1:2. From FIG. 2, we can see that 1) the sim_appx simulation curves almost overlap with the corresponding sim_exact simulation curves, respectively, and 2) with the number of LP nodes increasing, the simulated throughput ratio between the first half of and the second half of m nodes is still about 1:2. For the target value of 1:2, the mean relative error and the maximum relative error are 0.91% and 2.23%, respectively. This manifests that the disclosed scheduling scheme can guarantee the proportional throughput requirements of the LP class.

FIG. 3 plots the system throughput versus the number of the LP nodes. From FIG. 3, we can see that 1) the sim_exact and sim_appx simulation curves closely match the ana_exact theoretical curve which plots the maximum system throughput limit, where the difference between ana_exact and sim_exact is due to the rounding errors of CW, and 2) the ana_appx theoretical curve matches the ana_exact theoretical curve well with the nodes number increasing. For the targeted approximation solution (21), the mean relative error and the maximum relative error are 1.18% and 2.06%, respectively. This manifests that the proposed throughput guarantee scheme can maximize the system throughput. In addition, the simulation shows that the maximum system throughput is a quasi-constant regardless of how the node number varies, which has been approximately predicted in Theorem 1(b).

E. The Present Invention

The results obtained in Sections B and C are used in the development of the present invention.

According to the present invention, a method for scheduling a random-access communication system having one or more HP nodes, one or more LP nodes and a hub is provided. The one or more HP nodes and the one or more LP nodes contend for sending data packets to the hub. Each individual HP node has a pre-determined throughput value for the system to provide by the scheduling, and the scheduling is configured such that the system provides an absolute throughput guarantee for the one or more HP nodes, and a proportional throughput guarantee for the one or more LP nodes.

The random-access communication system may be a WLAN, but the present invention is not limited only to a WLAN. In case of a WLAN, the hub is an AP. The WLAN may be an IEEE 802.11-compliant WLAN. As is used in the IEEE 802.11-compliant WLAN, the contention method is based on a carrier sense multiple access with collision avoidance (CSMA/CA) protocol.

Exemplarily, the method comprises obtaining a length of a CW assigned to an individual node, which is either a HP or a LP node, from a per-slot attempt rate of this individual node. The CW length is computed from the per-slot attempt rate by (1). In addition, the method further comprises determining the attempt rate of each individual node by an algorithm configured such that a resultant sum of the per-slot attempt rates of all the individual nodes is a fixed value independent of the number of the individual nodes. The last feature is based on Theorem 1(b) above. As a result, the algorithm generates β', the per-slot attempt rate of one of the one or more HP nodes, by $$\beta' = \frac{B + T_c e^\varphi}{A'}, \quad (23)$$

and CW', the length of the CW assigned to said one of the one or more HP nodes, by $$CW' = \lfloor 2/\beta' - 1 \rfloor, \quad (24)$$

where: $A' = L/a' + \sigma - T_c$ in which a' is the pre-determined throughput value of said one of the one or more HP nodes; and $\lfloor z \rfloor$ is a rounding function for rounding the value of z to an integer value. Numerical results of Section D demonstrate that the CW lengths computed by the disclosed method lead to a system throughput that approaches the maximum one.

Figure 4:
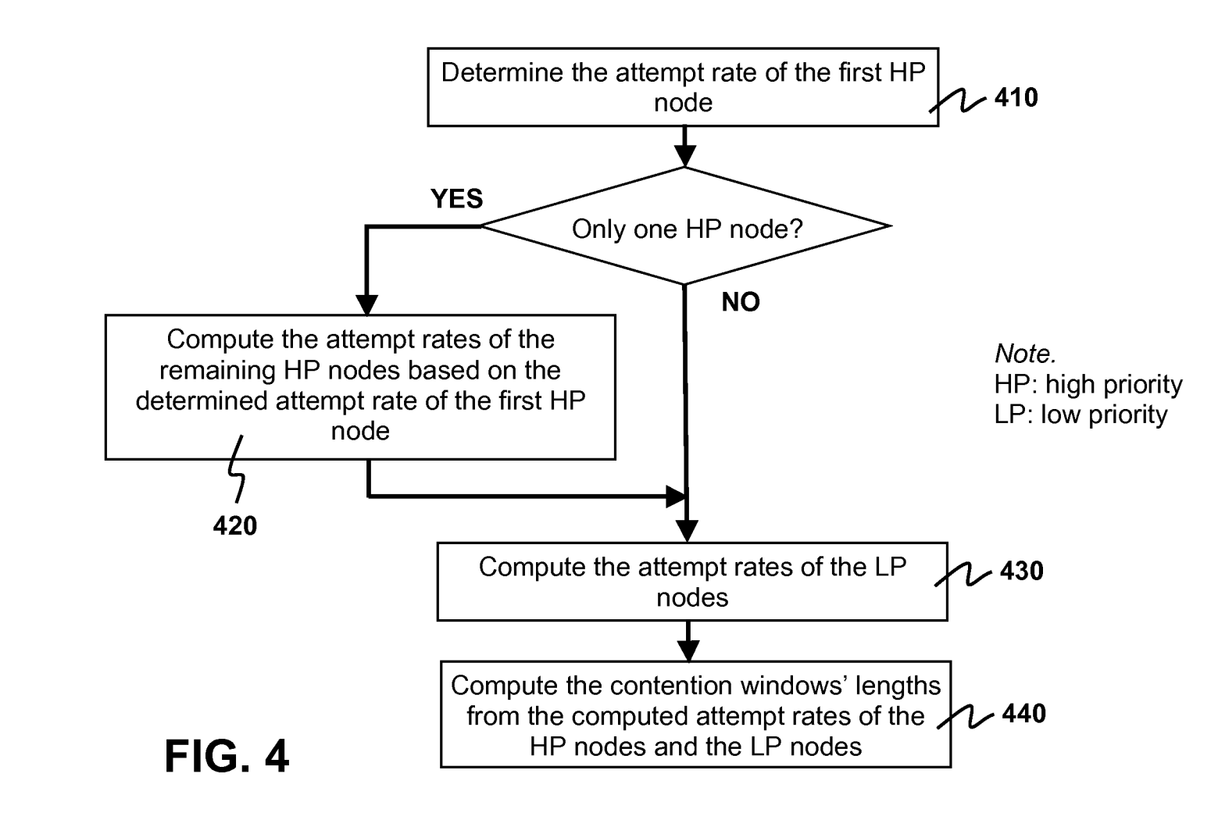
FIG. 4 depicts a flowchart illustrating the determination of contention windows for nodes of different classes according to an exemplary embodiment of the present invention.

FIG. 4 is a flowchart showing the steps carried out in the method according to an exemplary embodiment of the present invention. A per-slot attempt rate of a first HP node is first determined in a step 410 by an expression given in (16). If there are more than one HP nodes in the random-access communication system, the attempt rates of the remaining HP nodes are computed in a step 420 according to (17). After the attempt rate(s) for all the HP node(s) are obtained, the attempt rates of the LP nodes are determined in a step 430 by (16) if there is only one HP node in the system, and by (18) after substituting (22) thereinto if there are more-than-one HP nodes. Finally, the CW lengths of all the HP and the LP nodes are computed from the attempt rates by (1) in a step 440.

The method disclosed herein can be implemented in an AP having a function of scheduling a WLAN. The AP comprises one or more processors configured to execute a process for scheduling the WLAN to provide an absolute throughput guarantee for one or more HP nodes and a proportional throughput guarantee for one or more LP nodes by a method according to an embodiment of the present invention.

The embodiments disclosed herein may be implemented using general purpose or specialized computing devices, computer processors, or electronic circuitries including but not limited to digital signal processors (DSP), application specific integrated circuits (ASIC), field programmable gate arrays (FPGA), and other programmable logic devices configured or programmed according to the teachings of the present disclosure. Computer instructions or software codes running in the general purpose or specialized computing devices, computer processors, or programmable logic devices can readily be prepared by practitioners skilled in the software or electronic art based on the teachings of the present disclosure.

The present invention may be embodied in other specific forms without departing from the spirit or essential characteristics thereof. The present embodiment is therefore to be considered in all respects as illustrative and not restrictive. The scope of the invention is indicated by the appended claims rather than by the foregoing description, and all changes that come within the meaning and range of equivalency of the claims are therefore intended to be embraced therein.

What is claimed is:

1. A method for scheduling a random-access communication system having one or more high-priority (HP) nodes, one or more low-priority (LP) nodes and a hub, the method comprising:

obtaining a length of a contention window assigned to an individual node, which is either one of the HP nodes or one of the LP nodes, from a per-slot attempt rate of the individual node; and determining the per-slot attempt rate of the individual node by an algorithm configured such that a resultant sum of the per-slot attempt rates of all of the individual nodes is a fixed value independent of the number of the individual nodes;

wherein the one or more HP nodes and the one or more LP nodes contend for sending data packets to the hub;

wherein each of the HP nodes has a pre-determined throughput value for the system provided by the scheduling;

wherein the scheduling is configured such that the system provides an absolute throughput guarantee for the one or more HP nodes, and a proportional throughput guarantee for the one or more LP nodes; and wherein β', the per-slot attempt rate of one of the one or more HP nodes, is determined by the algorithm as $$\beta' = \frac{B + T_c e^\varphi}{A'}$$

where:
$A' = L/a' + \sigma - T_c$;
$B = \sigma - T_c$;
$\varphi \in (0,1)$ is a solution to $h(\varphi) = 0$ in which $h(\varphi) = B + T_c e^\varphi (1-\varphi)$;
a' is the pre-determined throughput value of said one of the one or more HP nodes;
L is a packet size adopted in the system;
σ is the duration of one time slot; and
$T_c$ is the mean time of an unsuccessful transmission.

2. The method of claim 1, wherein the random-access communication system is a wireless local area network (WLAN) and the hub is an access point of the WLAN.

3. The method of claim 2, wherein the WLAN is an IEEE 802.11-compliant WLAN.

4. An access point having a function of scheduling a wireless local area network (WLAN) having one or more high-priority (HP) nodes, one or more low-priority (LP) nodes and the access point, where the one or more HP nodes and the one or more LP nodes contend for sending data packets to the access point, and each individual HP node has a pre-determined throughput value for the WLAN to provide, wherein the access point comprises one or more processors configured to execute a process for scheduling the WLAN to provide an absolute throughput guarantee for the one or more HP nodes and a proportional throughput guarantee for the one or more LP nodes by the method of claim 3.

5. An access point having a function of scheduling a wireless local area network (WLAN) having one or more high-priority (HP) nodes, one or more low-priority (LP) nodes and the access point, where the one or more HP nodes and the one or more LP nodes contend for sending data packets to the access point, and each individual HP node has a pre-determined throughput value for the WLAN to provide, wherein the access point comprises one or more processors configured to execute a process for scheduling the WLAN to provide an absolute throughput guarantee for the one or more HP nodes and a proportional throughput guarantee for the one or more LP nodes by the method of claim 2.

6. The method of claim 1, wherein a carrier sense multiple access with collision avoidance (CSMA/CA) protocol is used by the one or more HP nodes and the one or more LP nodes to contend for sending data packets to the hub.

7. The method of claim 1, wherein the contention window assigned to said one of the one or more HP nodes has the length, CW', computed by $$CW'=\lfloor 2/\beta'-1\rfloor$$

where [.] is a rounding function.

8. The method of claim 7, wherein the random-access communication system is a wireless local area network (WLAN) and the hub is an access point of the WLAN.

9. The method of claim 8, wherein the WLAN is an IEEE 802.11-compliant WLAN.

10. An access point having a function of scheduling a wireless local area network (WLAN) having one or more high-priority (HP) nodes, one or more low-priority (LP) nodes and the access point, where the one or more HP nodes and the one or more LP nodes contend for sending data packets to the access point, and each individual HP node has a pre-determined throughput value for the WLAN to provide, wherein the access point comprises one or more processors configured to execute a process for scheduling the WLAN to provide an absolute throughput guarantee for the one or more HP nodes and a proportional throughput guarantee for the one or more LP nodes by the method of claim 9.

11. An access point having a function of scheduling a wireless local area network (WLAN) having one or more high-priority (HP) nodes, one or more low-priority (LP) nodes and the access point, where the one or more HP nodes and the one or more LP nodes contend for sending data packets to the access point, and each individual HP node has a pre-determined throughput value for the WLAN to provide, wherein the access point comprises one or more processors configured to execute a process for scheduling the WLAN to provide an absolute throughput guarantee for the one or more HP nodes and a proportional throughput guarantee for the one or more LP nodes by the method of claim 8.

12. The method of claim 7, wherein a carrier sense multiple access with collision avoidance (CSMA/CA) protocol is used by the one or more HP nodes and the one or more LP nodes to contend for sending data packets to the hub.

13. A method for scheduling a random-access communication system having a hub and N nodes contending for sending data packets to the hub, the N nodes consisting of n high-priority (HP) nodes and m (LP) nodes where n≥1, m≥1 and N=n+m, the N nodes being arranged such that an i th node is a HP node for n≥i≥1 and is a LP node for N≥i≥n+1, the scheduling being configured such that the system provides an absolute throughput guarantee for the n HP nodes and a proportional throughput guarantee for the m LP nodes, the method comprising:

for N≥i≥1, computing $CW_i$, a length of a contention window assigned to the i th node, from $\beta_i$, a per-slot attempt rate of the i th node, by $$CW_i=\lfloor 2/\beta_i-1\rfloor;$$

computing $\beta_1$ by $$\beta_1 = \frac{B+T_c e^\varphi}{A};$$

when n>1, computing $\beta_i$ for n≥i≥2 by $$\beta_i = \frac{a_i}{a_1}\beta_1;$$

and
computing $\beta_{n+i}$ for m≥i≥1 by $$\beta_{n+i} = \begin{cases} \dfrac{r_i}{\sum_{j=1}^{m} r_j}\varphi, & n=1 \\ \dfrac{r_i}{\sum_{j=1}^{m} r_j}\left(\varphi - \sum_{j=2}^{n}\beta_j\right), & n>1 \end{cases};$$

wherein:
[.] is a rounding function;
$a_i$, n≥i≥1, is a pre-determined throughput value for the system to provide to the i th node by the scheduling;
$r_i$, m≥i≥1, is a pre-determined proportional throughput ratio between the (n+i)th node and the (n+1)th node;
$A=L/a_1+\sigma-T_c$;
$B=\sigma-T_c$;
$\phi\in(0,1)$ is a solution to $h(\phi)=0$ in which $h(\phi)=B+T_c e^\phi(1-\phi)$;
L is a packet size adopted in the system;
$\sigma$ is the duration of one time slot; and
$T_c$ is the mean time of an unsuccessful transmission.

14. The method of claim 13, wherein the random-access communication system is a wireless local area network (WLAN) and the hub is an access point of the WLAN.

15. The method of claim 14, wherein the WLAN is an IEEE 802.11-compliant WLAN.

16. An access point having a function of scheduling a wireless local area network (WLAN) having the access point and N nodes contending for sending data packets to the access point, the N nodes consisting of n high-priority (HP) nodes and m (LP) nodes where n≥1, m≥1 and N=n+m, the N nodes being arranged such that an i th node is a HP node for n≥i≥1 and is a LP node for N≥i≥n+1, wherein the access point comprises one or more processors configured to execute a process for scheduling the WLAN to provide an absolute throughput guarantee for the n HP nodes and a proportional throughput guarantee for the m LP nodes by the method of claim 15.

17. An access point having a function of scheduling a wireless local area network (WLAN) having the access point and N nodes contending for sending data packets to the access point, the N nodes consisting of n high-priority (HP) nodes and m (LP) nodes where n≥1, m≥1 and N=n+m, the N nodes being arranged such that an i th node is a HP node for n≥i≥1 and is a LP node for N≥i≥n+1, wherein the access point comprises one or more processors configured to execute a process for scheduling the WLAN to provide an absolute throughput guarantee for the n HP nodes and a proportional throughput guarantee for the m LP nodes by the method of claim 14.

18. The method of claim 13, wherein a carrier sense multiple access with collision avoidance (CSMA/CA) protocol is used by the one or more HP nodes and the one or more LP nodes to contend for sending data packets to the hub.

* * * * *